Dec. 12, 1961    E. R. FITZGERALD    3,013,142
CONTACT RESISTANCE SEAM WELDING APPARATUS
Filed July 15, 1959    2 Sheets-Sheet 1

INVENTOR.
EDWARD R. FITZGERALD
BY
*Alfred C. Body*
ATTORNEY

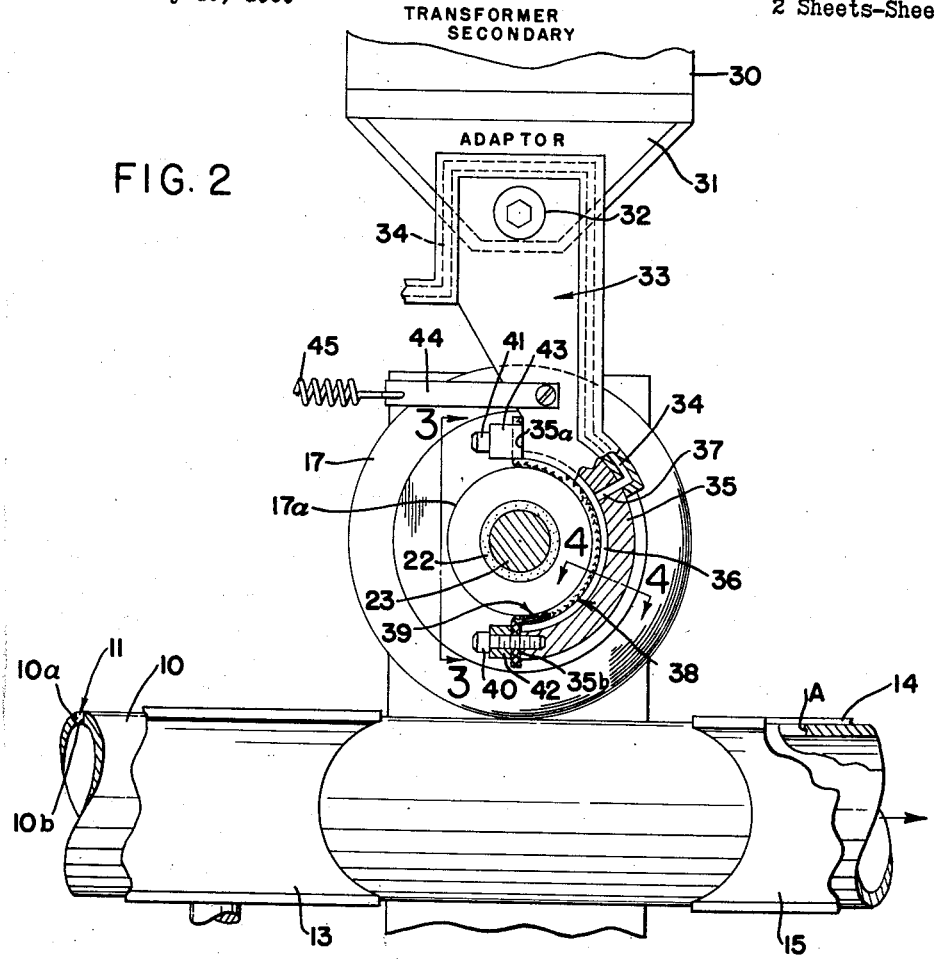
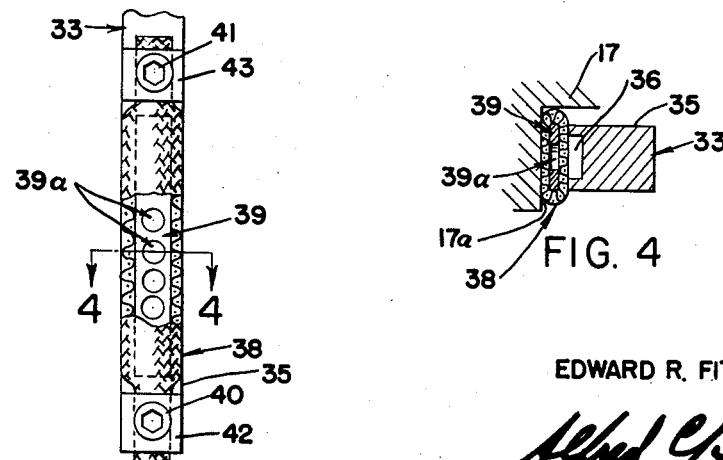

United States Patent Office 3,013,142
Patented Dec. 12, 1961

3,013,142
CONTACT RESISTANCE SEAM WELDING APPARATUS
Edward R. Fitzgerald, Cleveland, Ohio, assignor to The Ohio Crankshaft Company, Cleveland, Ohio, a corporation of Ohio
Filed July 15, 1959, Ser. No. 827,338
8 Claims. (Cl. 219—84)

This invention pertains to the art of seam welding and more particularly to apparatus for contact resistance type seam welding.

In the art of seam welding, it is conventional to provide a C-shaped tube having spaced longitudinal edges, to advance this tube along a predetermined path of movement and to continuously move the edges into abutting engagement at a fixed point in the path of movement. A pair of electrically energized, rotary contact rolls engage the edges and cause an electrical current to flow between the edges at the point of engagement. This current is of an extremely high order of magnitude and rapidly brings the point of engagement to the welding temperature.

In such seam welding arrangements, difficulty has been experienced in conducting the very high electrical currents to the contact rolls. Ordinarily a fixed sleeve or semi-sleeve engages a rotating cylindrical surface on the rolls. Because of the high currents involved and the need to have low electrical resistance between the sliding contacts, relatively high pressures must be maintained between the surfaces. The result is that the surfaces tend to score or rapidly wear away.

The present invention deals directly with this last mentioned problem.

In accordance with the present invention, a pair of electrically conductive members are provided, one being fixed against movement and electrically connected to a source of electrical power and the other being rotatable with and electrically connected to the contact roll, the members having surfaces in sliding electrical engagement, one of the members being comprised of porous electrically conductive material having a plurality of interstices or small passages through the contact surface and communicating with an interior passage in combination with means for supplying a liquid to such passage. The result is that the liquid flows through the interstices of the surface, continuously cooling the rubbing surfaces and preventing the development of localized hot spots in the rubbing surfaces, while at the same time not interfering with the flow of electric current between the surfaces. With this arrangement, metal-to-metal contact is provided at a plurality of small area points on the porous material, each of which is continuously cooled by the coolant.

It is an object of this invention to provide a novel arrangement for applying welding current to a contact roll in a resistance tube welding apparatus.

Another object of this invention is to provide such an arrangement which avoids any tendency for overheating at the contact roll where the welding current is applied thereto.

Another object of this invention is to provide such an arrangement in which there are a multiplicity of small area metal-to-metal contacts to the contact roll which are continuously lubricated by coolant to prevent the occurrence of hot spots due to friction and/or $I^2R$ losses.

Another object of this invention is to provide such an arrangement which is rugged and dependable in operation, which may be readily and inexpensively constructed, and in which the part subject to wear may be replaced readily.

Further objects and advantages of this invention will be apparent from the following detailed description of a presently-preferred embodiment thereof, which is illustrated in the accompanying drawing.

In the drawing:

FIGURE 2 is an elevational view, with parts broken away for clarity, showing the contact arm arrangement of the present invention for applying the welding current to one of the contact rolls which engage the tube;

Figure 1:
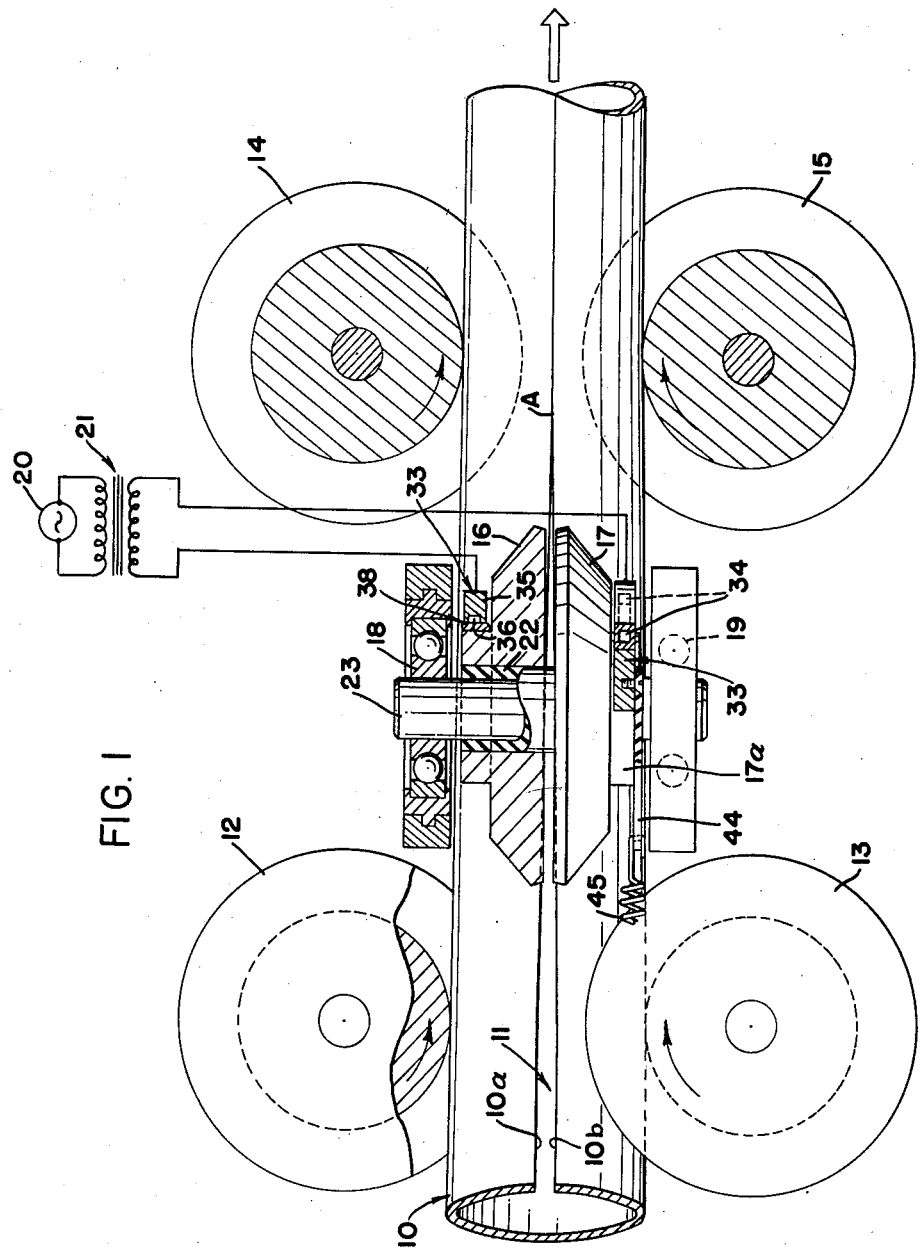
FIGURE 1 is a top plan view, with parts broken away for clarity, showing a resistance tube welding arrangement in which the present invention may be employed advantageously.

FIGURE 3 is a fragmentary elevational view, with parts broken away, taken along the line 3—3 in FIGURE 2 and showing the braid sleeve liner for the contact arm; and FIGURE 4 is a section taken along the line 4—4 in FIGURES 2 and 3 and showing the cross-section of the contact arm at its cooling groove and the cross-section of the braid sleeve overlying this groove.

Referring first to FIGURE 1, the tube 10 which is to be welded is generally C-shaped in cross-section before the welding operation takes place. Thus, as shown in FIGURE 1, the tube presents opposite longitudinal edges 10a and 10b which are spaced apart by a longitudinal gap 11 in the tube. The tube is advanced in the direction indicated by the arrow in FIGURE 1 and passes between a first pair of oppositely disposed pinch rollers 12 and 13, each of which has a grooved periphery which receives the tube at a location spaced about 90° around the tube from the gap 11 therein. The conjoint action of these pinch rollers is to pinch the tube inwardly and cause its opposite longitudinal edges 10a and 10b to approach each other.

A second pair of similar grooved pinch rollers 14 and 15 engage the tube 10 at a location farther along its path of movement. These pinch rollers of the second pair exert an additional pinching force on the tube 10 and cause the opposite longitudinal edges 10a and 10b of the tube to engage each other at the point A.

A pair of rotary contact rolls 16 and 17 engage the tube 10 on opposite sides of longitudinal gap 11 therein. These contact rolls are rotatably supported by suitable fixedly positioned bearings 18 and 19 and are located between the first and second sets of pinch rollers, some distance ahead of the point A at which the opposite longitudinal edges of the tube are brought together. The contact rolls 16 and 17 are both mounted on an insulation sleeve 22 carried by a shaft 23 which is rotatably supported by the bearings 18 and 19.

Welding current from a suitable power source 20 is supplied through a transformer 21 to these contact rolls. This welding current is conducted through each contact roll 16 or 17 and flows therefrom into the tube 10, flowing lengthwise along the tube adjacent the longitudinal gap 11 therein and crossing over between the edges of the tube at substantially their point of engagement A. Thus, a continuous weld is formed at the abutting longitudinal edges of the tube.

Thus far, the apparatus is of known design, the details of which form no part of the present invention.

Referring now to FIGURES 2–4, in accordance with the present invention, there is provided a novel and advantageous arrangement for applying the welding current to the contact rolls 16 and 17. FIGURE 2 shows the arrangement for the contact roll 17 in FIGURE 1. It is to be understood that the arrangement for the other contact roll 16 in FIGURE 1 is identical.

As shown in FIGURE 2, the transformer secondary winding is provided with a terminal 30, which may be in the form of the usual "fishtail" lead. This terminal is fitted with an adapter 31, which is a short, water-cooled bus bar. A copper boss 32 is brazed to this adapter, extending laterally therefrom and constituting a fixed pivot for a contact arm 33. Preferably the contact arm is of highly conductive material, such as copper. The contact arm 33 has a circular hole bored thereinto which receives the boss 32, so that the boss constitutes a pivot about which the contact arm 33 may move angularly. The contact arm is formed with a passage 34 for conducting a suitable coolant fluid, such as soluble oil and water. As shown in FIGURE 2, this coolant passage 34 extends from the left side of the contact arm 33 upward and across the top of the contact arm and then down the right side of the contact arm.

At its lower end, the contact arm presents a semi-circular yoke portion 35 which extends half-way around the hub 17a of the contact roll 17. This semi-circular yoke portion of the contact arm presents an inner, concave surface which has a radius approximately 1/16 inch greater than the radius of the hub 17a. A groove 36 is milled in this inner concave surface of the yoke portion 35 of the contact arm. As best seen in FIGURE 4, this groove 36 may be rectangular in cross section. This groove is connected to the coolant passage 34 in the contact arm through a radial passage 37 extending through the semi-circular portion 35 of the contact arm 33 and communicating with the lower end of the coolant passage 34, as shown in FIGURE 2. Thus, the coolant flowing through the passage 34 is discharged into the groove 36 extending around the hub 17a of the contact roll 17.

Further in accordance with the present invention, there is provided a soft, flexible, porous, copper braid sleeve 38, which extends across the concave inner face of the semi-circular lower end 35 of the contact arm 33. As best seen in FIGURE 4, this braid sleeve extends completely across the open, inner side of the groove 36 and engages the semi-circular end 35 of the contact arm at opposite sides of this groove. In one practical embodiment, this copper braid sleeve may be identical to the type used in the electronics industry as a shield for current-carrying wires to shield such wires from external stray fields. The copper braid sleeve may be either of tinned or bare copper.

Preferably, in accordance with the present invention, a thin, perforated copper strip 39 is inserted into the copper braid sleeve 38. The purpose of this strip insert is to prevent the flattened copper braid sleeve from working its way into the coolant grove 36, which would block the flow of the coolant fluid. The strip 39 is slightly wider than the coolant groove 36 and it is perforated to provide a plurality of openings 39a which allow the coolant to flow from the groove 36 through the braid sleeve 38 and through the strip 39 to flood the inner face of the braid liner, which is in contact with the hub 17a of the contact roll 17, as best seen in FIGURE 4.

As best seen in FIGURES 2 and 3, the opposite ends of the braid sleeve 38 extend vertically across flat faces 35a and 35b formed at the respective upper and lower end of the semi-circular portion 35 of the contact arm. The strip insert 39 inside the braid sleeve 38 terminates at each end just short of the bend formed in the braid sleeve where it extends across the respective end face 35a or 35b. That is, the copper strip insert 35 extends across substantially the full length of the coolant groove 36, but it does not extend across the upper and lower end faces 35a and 35b of the semi-circular portion 35 of the contact arm.

The opposite ends of the braid sleeve 38 are clamped against these end faces by means of screws 40 and 41, respectively, and generally U-shaped members 42 and 43, respectively. Each of these U-shaped members is connected integrally to the respective end face 35a or 35b on the lower end portion 35 of the contact arm and defines therewith a vertical passage which receives the respective end portion of the braid sleeve 38. The screws 40 and 41 are threadedly received in the U-shaped members 42 and 43, respectively, and at their inner ends they bear against the braid sleeve to clamp the latter in place.

An insulation arm 44 is bolted to the contact arm 33 above its semi-circular lower end. A tension spring 45 is connected to this arm 44 and serves to bias the lower end 35 of the contact arm to the left in FIGURE 2, thereby maintaining the braid sleeve 38 against the hub 17a of the contact roll 17. Also, this spring maintains the contact arm 33 in metal-to-metal engagement with the hub 32 on the adaptor.

In the operation of this arrangement, the coolant fluid which flows into the left end of the coolant passage 34 in FIGURE 2 flows lengthwise along the passage and thence through the radial passage 37 formed in the semi-circular lower end 35 of this contact arm, into the groove 36, which extends in a semi-circle about the hub 17a of the contact roll 17. The coolant passes through the interstices in the braid sleeve 38 and through the perforations 39a in the strip 39 and such coolant fluid floods the radially inward side of the braid sleeve and provides lubrication for the hub 17a of the rotating rolling contact member 17. Such lubricating action, of course, does not interfere with the metal-to-metal electrical contact between the braid sleeve 38 and the hub 17a of the contact roll 17. Such metal-to-metal contact is provided at a plurality of small area points on the porous braid sleeve 38, all of which are continuously lubricated by the coolant to prevent the formation of localized hot spots due to the rubbing friction between the braid sleeve and the hub 17a and/or $I^2R$ losses there. The current from the transformer secondary 30 flows through the adaptor 31 and through the contact arm 33 to the braid sleeve 38 and thence through the hub 17a of the rolling contact member 17 and then to the periphery of this rolling contact member and into the tube 10.

In the operation of this arrangement, as described, the strip 39 inside the braid sleeve 38 insures that the braid sleeve does not work its way into the coolant groove 36 to interfere with the flow of coolant fluid there. In the event that replacement of the braid sleeve 38 is required because of undue wear, such replacement can be effected promptly, simply by loosening the screws 40 and 41 and removing the worn out braid sleeve 38 and inserting a new one in its place.

From the foregoing description it will be apparent that the illustrated embodiment of this invention is well adapted for accomplishing its stated purposes. However, it is to be understood that, while there has been described in detail herein and illustrated in the accompanying drawing, a specific, presently-preferred embodiment of this invention, various modifications, omissions and refinements which depart from the disclosed embodiment may be adopted without departing from the spirit and scope of this invention. For example, the porous contact member which engages the hub of the contact roll may be other than a braid sleeve, if desired.

Having thus described my invention, I claim:

1. In apparatus for the resistance welding of a workpiece by means of welding current applied to a contact roll which is in rolling contact with the workpiece, said contact roll being rotatably mounted and having a central hub, the improvement which comprises a contact arm of conductive material which is connected to receive the welding current, said contact arm having an arcuate portion which extends partially around the hub on the rolling member, said contact arm having a passage therein for the flow of coolant fluid and having a groove which is open at the inner face of said arcuate portion and which communicates with said passage to receive the coolant fluid therefrom, a braid sleeve of conductive material extending across the open side of said groove and contacting the hub on the contact roll around a portion of the periphery of the hub, and a perforated strip inside said sleeve which retains the sleeve against working its way to said groove to block the flow of coolant there.

2. The apparatus of claim 1 wherein said contact arm is adjustably mounted and wherein there is provided means resiliently biasing said contact arm to position its arcuate portion toward the hub on the contact roll so as to maintain said braid sleeve in contact with the hub on the contact roll.

3. In apparatus for the resistance welding of a workpiece by means of welding current applied to a contact roll which engages the workpiece, said contact roll having a hub, the improvement which comprises a contact arm of conductive material connected to receive the welding current and having an arcuate portion which receives the hub on the contact roll, said contact arm having a coolant passage therein and having a groove which is open at the inner face of said arcuate portion and which communicates with said passage to receive coolant therefrom, and conductive braided wire material mounted to extend across the open side of said groove and contacting the hub on the contact roll member.

4. The apparatus of claim 3 wherein there is provided means restraining said conductive woven wire material from working its way into the groove to block the flow of coolant there.

5. In apparatus for the resistance welding of a workpiece by means of welding current applied to a rotatably mounted contact roll which is in rolling contact with the workpiece, said contact roll having a central hub with a circular periphery, the improvement which comprises a contact arm of conductive material which is connected at one end to receive the welding current, said contact arm at its opposite end presenting a concave inner face which extends in a semi-circle half way around the periphery of the hub on the contact roll, said contact arm having a coolant passage therein which extends from said one end of the contact arm to said opposite end thereof, said contact arm having a groove which extends the length of said concave inner face and which is open at said concave inner face and which communicates with said passage to receive the coolant fluid therefrom, a braid sleeve of conductive material extending across the open side of said groove throughout the length of said concave inner face and contacting the hub of the contact roll half way around the periphery of said hub, and a perforated strip inside said sleeve which restrains the sleeve against working its way into said groove to block the flow of coolant fluid there.

6. The apparatus of claim 5 wherein said perforated strip is of highly conductive material.

7. The apparatus of claim 5 wherein the contact arm presents flat faces which extend laterally from the opposite ends of said concave inner face and the opposite ends of said braid sleeve extend across said flat faces, and wherein there are provided releasable attachment means for releasably clamping said opposite ends of the sleeve against flat faces.

8. The apparatus of claim 5 wherein the contact arm is pivotally mounted at said one end thereof, and wherein there is provided spring means biasing the contact arm angularly about its pivotal mounting to position its concave inner face toward the hub on the contact roll, with the braid sleeve engaging the hub.

References Cited in the file of this patent

UNITED STATES PATENTS

| | | |
|---|---|---|
| 2,357,490 | Palmer | Sept. 5, 1944 |
| 2,467,636 | Stoudt | Apr. 19, 1949 |
| 2,555,997 | Portail | June 5, 1951 |
| 2,594,594 | Smith | Apr. 29, 1952 |
| 2,673,333 | Seeloff | Mar. 23, 1954 |